D. JACKSON.
GREASE CUP.
APPLICATION FILED FEB. 17, 1916.

1,185,802.

Patented June 6, 1916.

Witnesses:

Duke Jackson, Inventor,
By _____ Atty.

UNITED STATES PATENT OFFICE.

DUKE JACKSON, OF PORTLAND, OREGON, ASSIGNOR OF TWO-THIRDS TO J. H. WOOD AND THOMAS ROBERTSON, BOTH OF PORTLAND, OREGON.

GREASE-CUP.

1,185,802.  Specification of Letters Patent.  Patented June 6, 1916.

Application filed February 17, 1916. Serial No. 78,876.

*To all whom it may concern:*

Be it known that I, DUKE JACKSON, a citizen of the United States, residing in the city of Portland, county of Multnomah, and State of Oregon, have invented certain new and useful Improvements in Grease-Cups, of which the following is a specification.

My invention relates to grease cups, and more particularly to a grease cup of the character adapted to be attached to a bearing, in open communication with the interior thereof, with means for gradually forcing hard grease down into the bearing. Some of these cups are constructed in two parts, one part of which is attached to the bearing, and the other part of which is a cup-like portion into which the grease is placed by means of a spoon, or paddle, and then it is screwed down on to the other part, in a way to force the grease down through the first part to the bearing. Another form of cup is to provide a cup body which is mounted upon the bearing with a plunger adapted to be screwed gradually into the cup after the grease has been placed therein by means of a spoon, or paddle, the plunger being used to gradually force the grease down into the bearing.

The principal object of my invention is to provide certain improvements in grease cups, whereby the grease can be supplied to the cups by means of a grease pump or other means for forcing grease into the cup through a suitable opening, and thus to eliminate the undesirable feature of having to remove the cup, or the plunger, fill the cup with grease by means of a spoon, or paddle, and then screw the parts together again.

In order that others may understand my invention, I have illustrated the same in the accompanying sheet of drawings which I will now describe.

Figure 1:
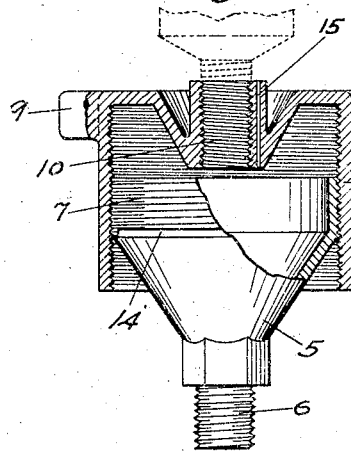
Figure 2:
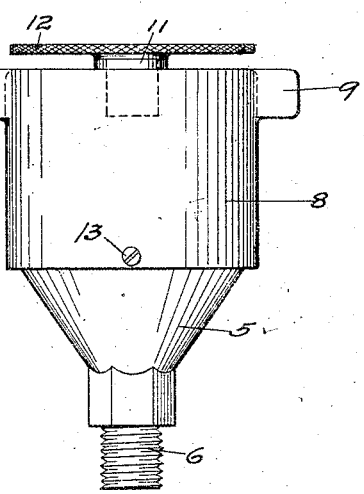
Figure 3:
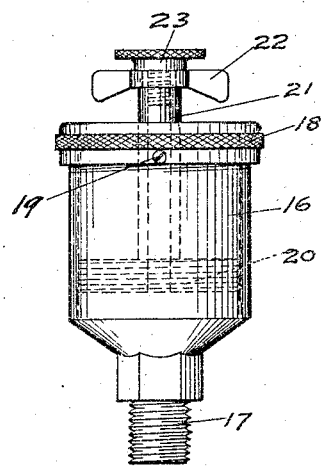

Figure 1 is a sectional view, partly in elevation, of a two-part grease cup embodying my invention; Fig. 2 is a side elevation thereof; Fig. 3 is a side elevation of a grease cup having a plunger therein, and also embodying my invention; and Fig. 4 is a sectional view through the plunger, removed from Fig. 3.

Referring now more in detail to the drawings, Figs. 1 and 2, 5 designates the body or lower portion of a grease cup with a threaded stem 6, adapted to be screwed into a bearing, said lower portion being of hopper-like construction, threaded around its upper edge, as at 7. 8 designates the cup portion of my improved grease cup, threaded interiorly and adapted to be screwed down over the portion 5, in the manner clearly indicated in Fig. 1, said cup having laterally projecting ears 9—9, by means of which it can be easily turned down on to the lower part 5, by hand. I have formed in the upper part of the cup 8, a filling opening 10, threaded interiorly and adapted to receive a plug 11, having a knurled thumb plate, or top 12, by means of which it can be readily screwed into and out of the filling, or supply, opening 10. In order to prevent the accidental loss of the cup portion 8, I have provided in its lower edge a screw 13, which operates as a stop in a groove 14, formed in the side of the lower portion 5, as indicated in Fig. 1. This screw operates as a limit stop for the up, or filled, position of the cup 8. I have also formed in the top of the cup 8, at one side of the supply opening 10, a vent opening 15, to permit the escape of air as grease is forced into the cup through the supply opening 10. In order to fill my improved grease cup here shown and described, it is only necessary to unscrew the cup 8, to its up position and then to attach the grease supply pump, or gun, shown in dotted line, Fig. 1, to the supply opening 10, and force the grease into the cup until it is filled, after which the plug 11 is screwed into place. The grease is forced down on to the bearing through the stem 6, by turning the grease cup 8, by means of the ears 9—9, at intervals, and as may be required.

Figure 4:
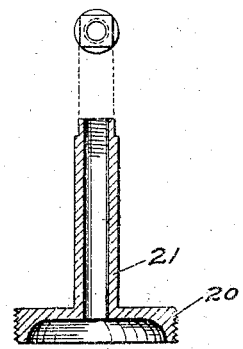

In Figs. 3 and 4, I have shown a grease cup 16, provided with a threaded attaching stem 17, and a cap 18, adapted to be held in place by means of a screw 19. The cup 16 is threaded interiorly and adapted to receive a screw plunger 20, shown in sectional view, Fig. 4, and having a hollow stem 21. The upper end of said stem is made square, as indicated in Fig. 4, to receive a thumb piece 22, by means of which said plunger can be turned down into the cup 16 to force the grease out through the stem 17. A screw plug 23, is adapted to screw into the upper end of the hollow stem 21, for closing the same, in the manner indicated in Fig. 3. In order to fill this form of cup it is only necessary to unscrew this plunger 20, until it reaches the top of the cup and then remove the screw plug 23, and attach the grease pump, or gun, as before, thus filling the grease cup through the hollow stem of the plunger, and avoiding the inconvenience and disagreeable feature of removing the entire cover and filling the cup by means of a spoon, or paddle.

I am aware that slight changes can be made in my invention without departing from the spirit thereof, and I do not, therefore, limit the invention to the particular forms here shown, except as I may be limited by the hereto appended claims forming a part thereof.

I claim:

1. A grease cup having an outlet and adapted to be attached to a bearing, a portion of said grease cup being adapted for gradually forcing grease therein through said outlet, said cup being provided with a supply inlet opening, adapted to have attached thereto a device for supplying grease therethrough under pressure, and means for closing said supply opening.

2. A bearing grease cup, comprising a body portion adapted to receive grease and having means for attaching it to a bearing, another portion adapted for forcing the grease in said cup through said attaching means to said bearing by the manipulation thereof, said grease cup having a supply opening adapted to have attached thereto a grease pump, or other means, for supplying means under pressure to said grease cup, and means for closing said supply opening, substantially as described.

3. A grease cup of the character referred to comprising a body portion adapted to receive a supply of grease and provided with an attaching means for attaching it to a bearing with feed outlet therethrough, a second part having threaded engagement with said body portion, and adapted to be screwed downwardly relative thereto, whereby to force grease therein through said feed outlet, said grease cup being provided with a supply inlet adapted to have attached thereto a supply nozzle for supplying grease under pressure therethrough, and a closure member adapted to close said supply inlet, substantially as described.

4. A grease cup of the character referred to, comprising in combination, a body portion provided with an attaching stem for attaching the same to a bearing and through which grease is supplied to said bearing, a cup portion threaded interiorly and adapted to be screwed down over said body portion, said cup portion being provided in its top with a supply inlet, adapted to have grease forced therethrough under pressure, and means for closing said supply inlet.

5. A grease cup of the character referred to, comprising in combination, a body portion provided with an attaching stem for attaching the same to a bearing and through which grease is supplied to said bearing, a cup portion threaded interiorly and adapted to be screwed down over said body portion, said cup portion being provided in its top with a supply inlet, adapted to have grease forced therethrough under pressure, means for closing said supply inlet, and means for limiting the upward movement of the cup upon the body portion, substantially as described.

6. A grease cup adapted to be secured to a bearing and having means as a part thereof for forcing grease therefrom to said bearing, said grease cup also having a supply opening adapted to have attached thereto a grease gun, or pump, for forcing grease under pressure into said grease cup.

Signed at Portland, Multnomah county, Oregon, this 10th day of February, 1916.

DUKE JACKSON.

In presence of—
I. M. GRIFFIN,
J. C. STRENG.